(12) United States Patent
Kiyota et al.

(10) Patent No.: US 9,812,850 B2
(45) Date of Patent: Nov. 7, 2017

(54) ELECTRICAL CONNECTION BOX AND WIRE HARNESS

(71) Applicant: YAZAKI CORPORATION, Tokyo (JP)

(72) Inventors: Hirotaka Kiyota, Shizuoka (JP); Akinori Nakashima, Shizuoka (JP); Yoshiya Miyazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/137,512

(22) Filed: Apr. 25, 2016

(65) Prior Publication Data

US 2016/0315455 A1 Oct. 27, 2016

(30) Foreign Application Priority Data

Apr. 27, 2015 (JP) ................................. 2015-090533

(51) Int. Cl.
*H02B 1/20* (2006.01)
*H02G 3/08* (2006.01)
*B60R 16/023* (2006.01)

(52) U.S. Cl.
CPC ......... *H02G 3/088* (2013.01); *B60R 16/0238* (2013.01)

(58) Field of Classification Search
CPC ............................ H02G 3/088; B60R 16/0238
USPC ............................................... 361/825–827
See application file for complete search history.

(56) References Cited

U.S. PATENT DOCUMENTS

| 5,967,819 | A | * | 10/1999 | Okada | H01R 9/245 439/212 |
| 6,133,531 | A | * | 10/2000 | Hayduke | H02G 3/081 174/67 |
| 7,253,356 | B2 | * | 8/2007 | Kiyota | H02G 3/081 174/17 R |
| 8,878,059 | B2 | * | 11/2014 | Makino | H02G 3/088 174/50 |
| 8,915,394 | B2 | * | 12/2014 | I | H02G 3/088 220/378 |
| 2005/0194167 | A1 | | 9/2005 | Kiyota et al. | |

FOREIGN PATENT DOCUMENTS

JP 2005-185031 A 7/2005

* cited by examiner

*Primary Examiner* — Hung S Bui
(74) *Attorney, Agent, or Firm* — Kenealy Vaidya LLP

(57) ABSTRACT

A wire harness includes an electrical connection box. The electrical connection box includes a body in which an electronic component is mounted and a lower cover. The lower cover covers a rectangular frame and a vertically lower end portion of the rectangular frame, and includes: a bottom disposed parallel to a panel of a vehicle body, the panel facing the lower cover; an inlet having the smallest distance from the panel; and a channel-forming depression. The channel-forming depression is provided on the vertically lower side than the inlet, formed by bending at least a part of the bottom toward the inside of the lower cover, and formed along a surface of the panel, so as to allow liquid that has entered between the bottom and the panel to flow to the outside.

5 Claims, 5 Drawing Sheets

ELECTRICAL CONNECTION BOX AND WIRE HARNESS

CROSS-REFERENCE TO RELATED APPLICATION(S)

The present application claims priority to and incorporates by reference the entire contents of Japanese Patent Application No. 2015-090533 filed in Japan on Apr. 27, 2015.

BACKGROUND OF THE INVENTION

1. Field of the Invention

The present invention relates to an electrical connection box and a wire harness.

2. Description of the Related Art

A vehicle such as an automobile includes an electrical connection box that distributes electric power from a power source such as a battery to electronic devices. This type of electrical connection box includes, for example, an electrical connection box that is disposed in an engine room or other area into which liquid such as water enters from the outside. An electrical connection box disposed in an engine room or other area is mounted with various electronic components, and has a box main body including a plurality of housings, the outline of the box main body being formed along a surface of a panel of the engine room.

As for an electrical connection box described in Japanese Patent Application Laid-open No. 2005-185031, for example, if the gap between the outer surface of a box main body and a surface of a panel is small, liquid that has entered an engine room or other area may accumulate in the gap between the outer surface of the box main body and the surface of the panel, and enter inside through a seam between housings.

SUMMARY OF THE INVENTION

In view of the circumstances described above, the present invention aims at providing an electrical connection box and a wire harness that can prevent liquid from entering inside a box main body including a plurality of housings.

In order to achieve the above mentioned object, an electrical connection box according to one aspect of the present invention includes a box main body that is fixed to a vehicle body and includes a first housing in which an electronic component is mounted and a second housing installed on a vertically lower side of the first housing with a locking mechanism, wherein the second housing includes a frame that includes the locking mechanism on an outer side-face of the frame, a bottom that is disposed parallel to a panel of the vehicle body, the panel facing the bottom, and covers a vertically lower end portion of the frame, an inlet that is provided on an outer surface of the second housing and has a smallest distance from the panel, and a channel-forming depression that is provided on the vertically lower side than the inlet, formed by bending at least a part of the bottom toward inside of the second housing, and formed along a surface of the panel gradually inclining toward the vertically lower side as the surface extends in one direction, so as to allow liquid that has entered between the bottom and the panel to flow from between the bottom and the panel to the outside.

Further, in the electrical connection box, according to another aspect of the present invention, it is possible to configure that a width of the channel-forming depression gradually increases as the channel-forming depression extends along the surface of the panel and toward the vertically lower side.

Further, in the electrical connection box, according to still another aspect of the present invention, it is possible to configure that a part of the locking mechanism is the inlet.

In order to achieve the above mentioned object, a wire harness according to still another aspect of the present invention includes an electrical connection box that includes a box main body that is fixed to a vehicle body and includes a first housing in which an electronic component is mounted and a second housing installed on a vertically lower side of the first housing with a locking mechanism; and an electrical wire that is electrically connected to the electronic component, wherein the second housing includes a frame that includes the locking mechanism on an outer side-face of the frame, a bottom that is disposed parallel to a panel of the vehicle body, the panel facing the bottom, and covers a vertically lower end portion of the frame, an inlet that is provided on an outer surface of the second housing and has a smallest distance from the panel, and a channel-forming depression that is provided on the vertically lower side than the inlet, formed by bending at least a part of the bottom toward inside of the second housing, and formed along a surface of the panel gradually inclining toward the vertically lower side as the surface extends in one direction, so as to allow liquid that has entered between the bottom and the panel to flow from between the bottom and the panel to the outside.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a sectional view taken along line VI-VI in FIG. 4. It is a sectional view of a positioning piece or the like.

DETAILED DESCRIPTION OF THE PREFERRED EMBODIMENTS

The following describes an embodiment of the present invention in detail with reference to the drawings. The embodiment is, however, not intended to limit the scope of the present invention. Components described in the following embodiment include those that are easily replaceable by the skilled person, or that are substantially the same.

Embodiment

Figure 1:
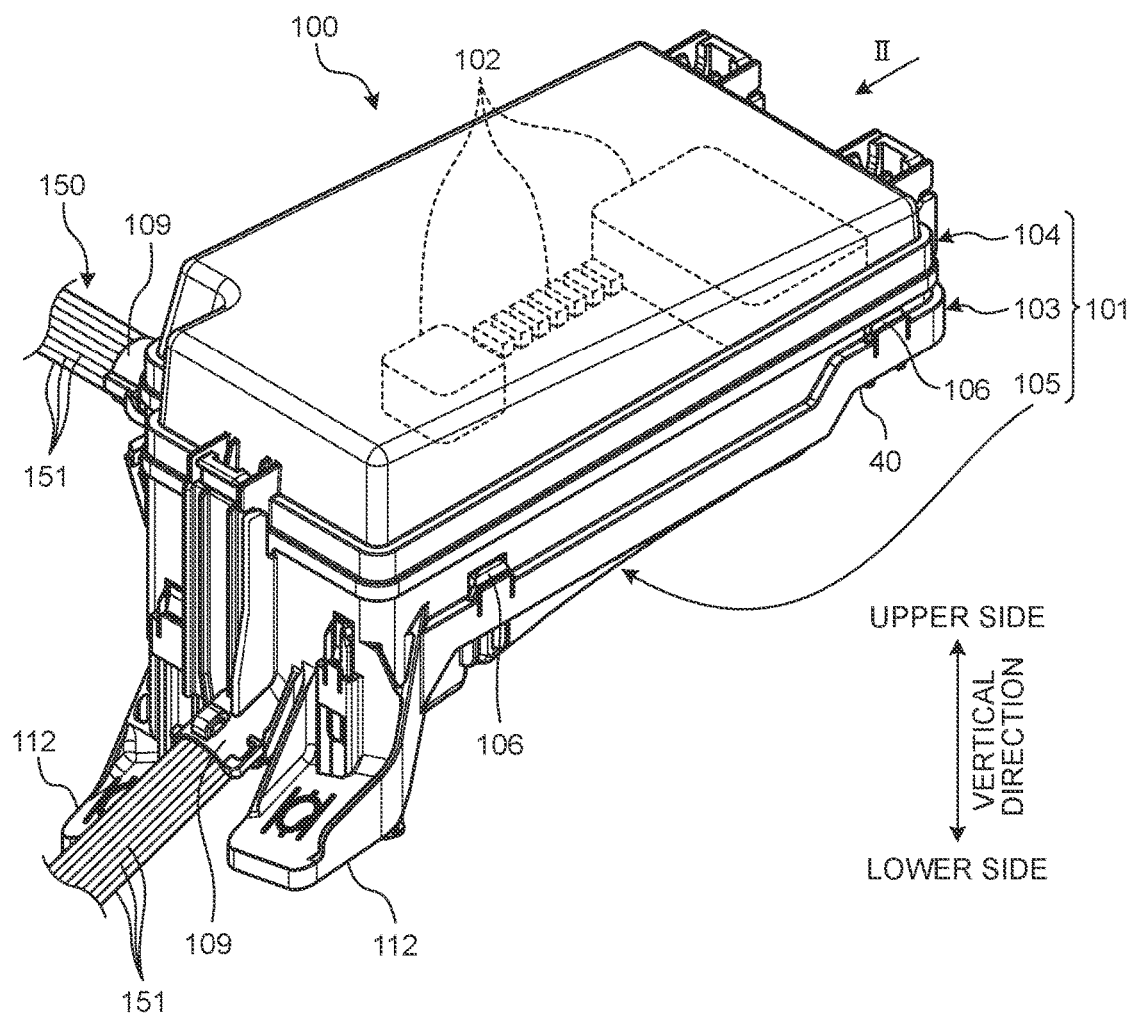
FIG. 1 is a perspective view illustrating a schematic configuration of an electrical connection box according to an embodiment of the present invention.
Figure 2:
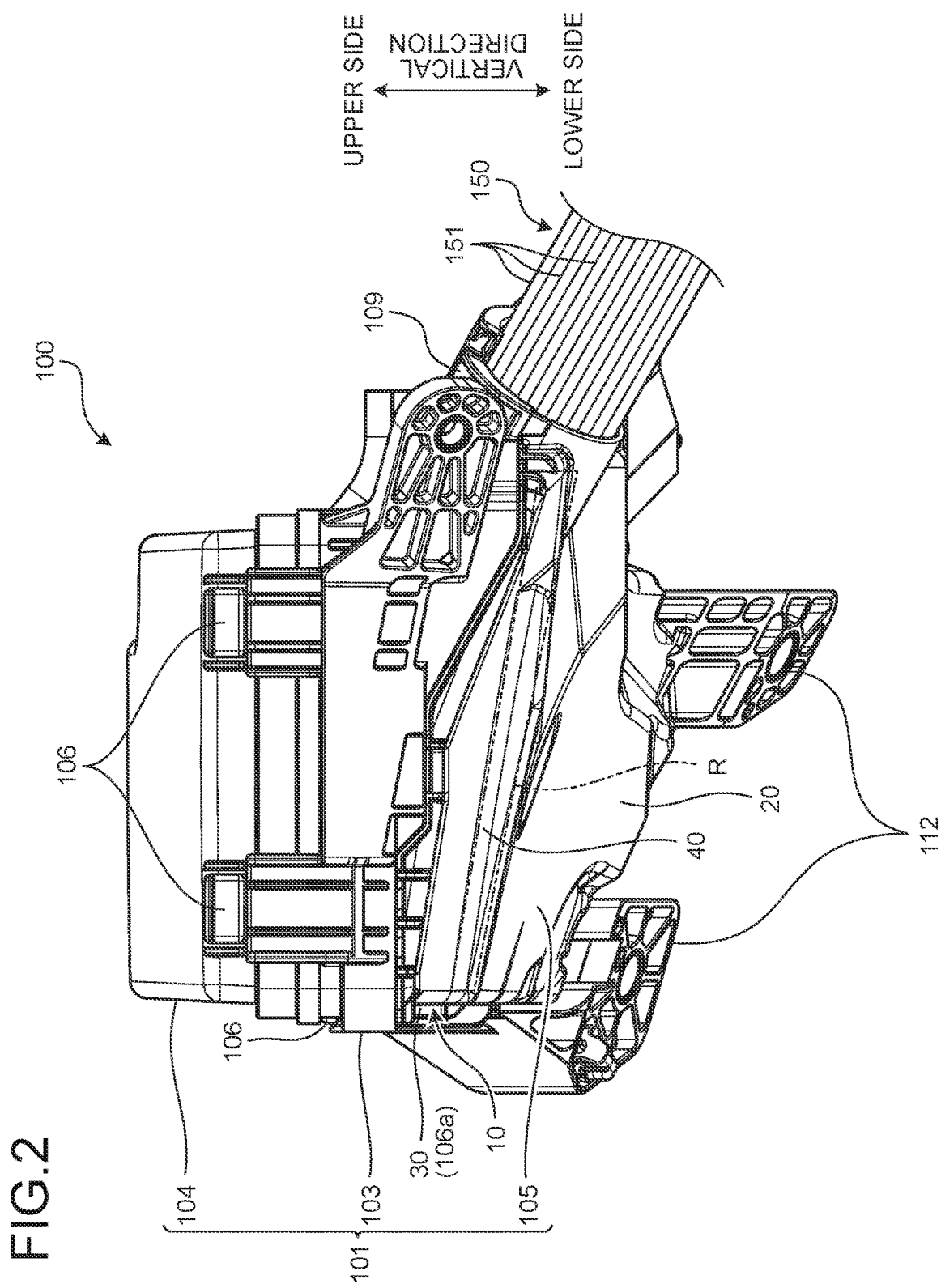
FIG. 2 is a rear view of the electrical connection box according to the embodiment viewed in the arrow II direction illustrated in FIG. 1.
Figure 3:
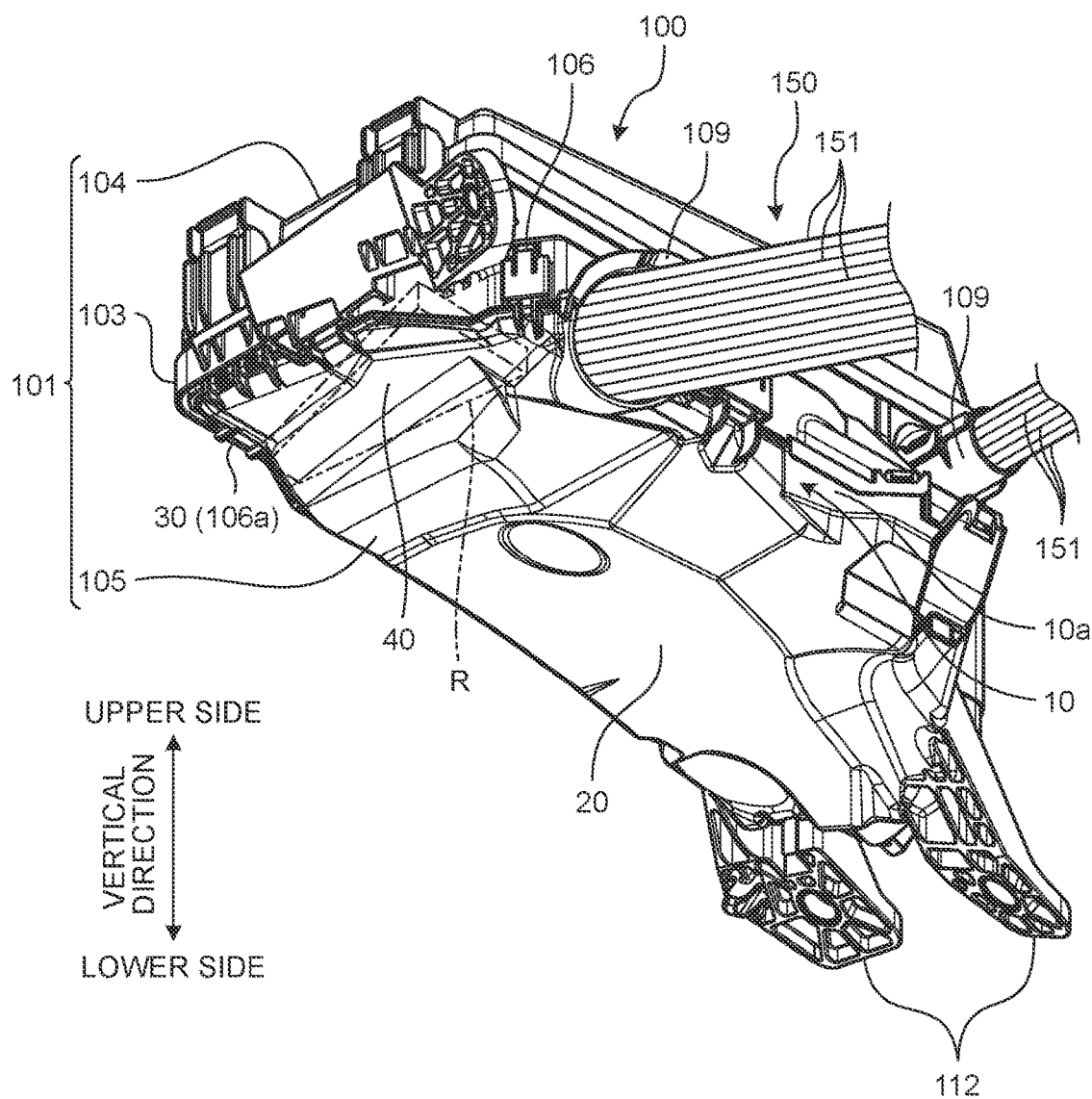
FIG. 3 is a perspective view of the electrical connection box according to the embodiment viewed from below.
Figure 4:
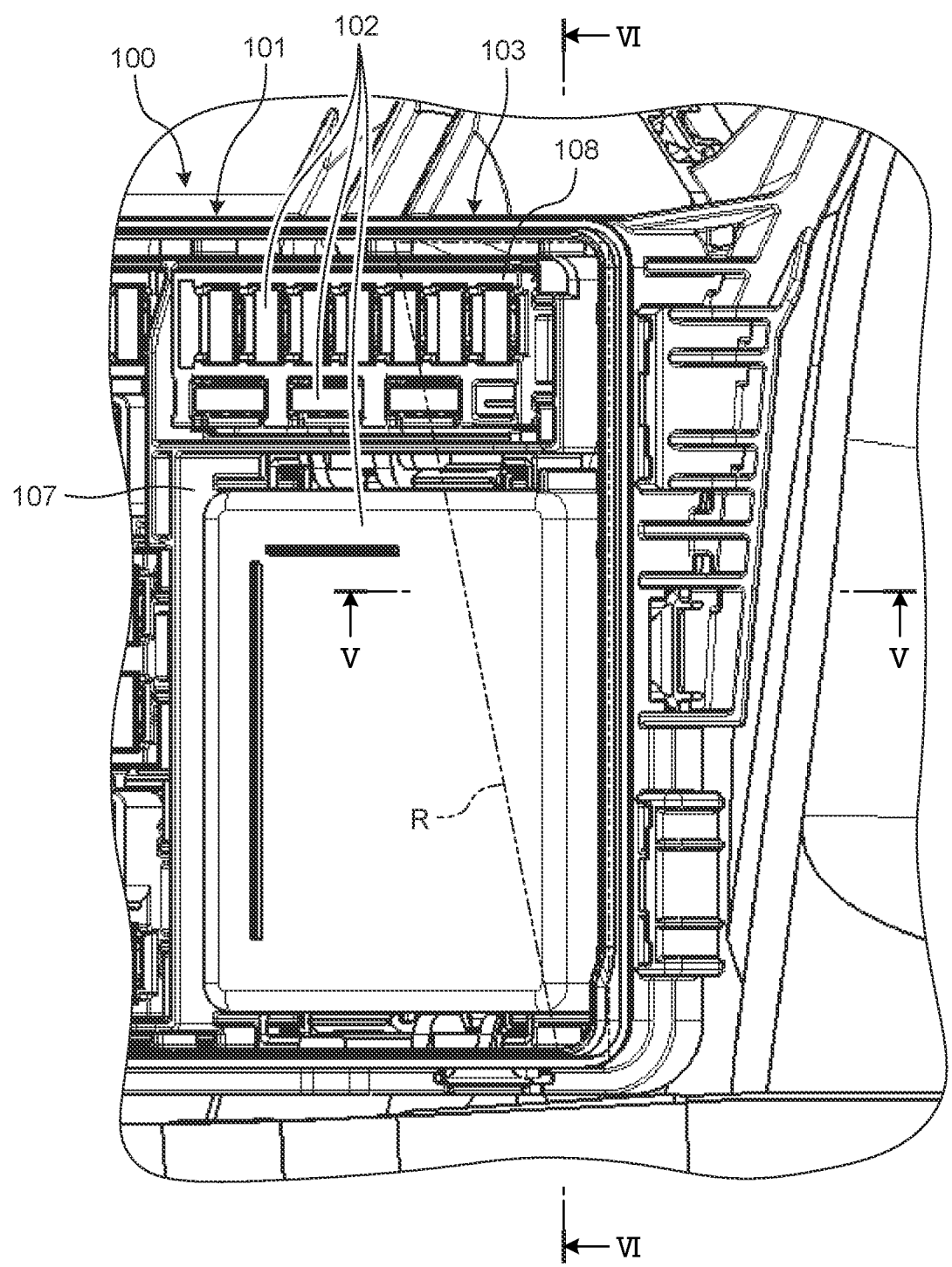
FIG. 4 is a plan view illustrating main parts of the electrical connection box according to the embodiment when mounted in a vehicle with an upper cover removed.
Figure 5:
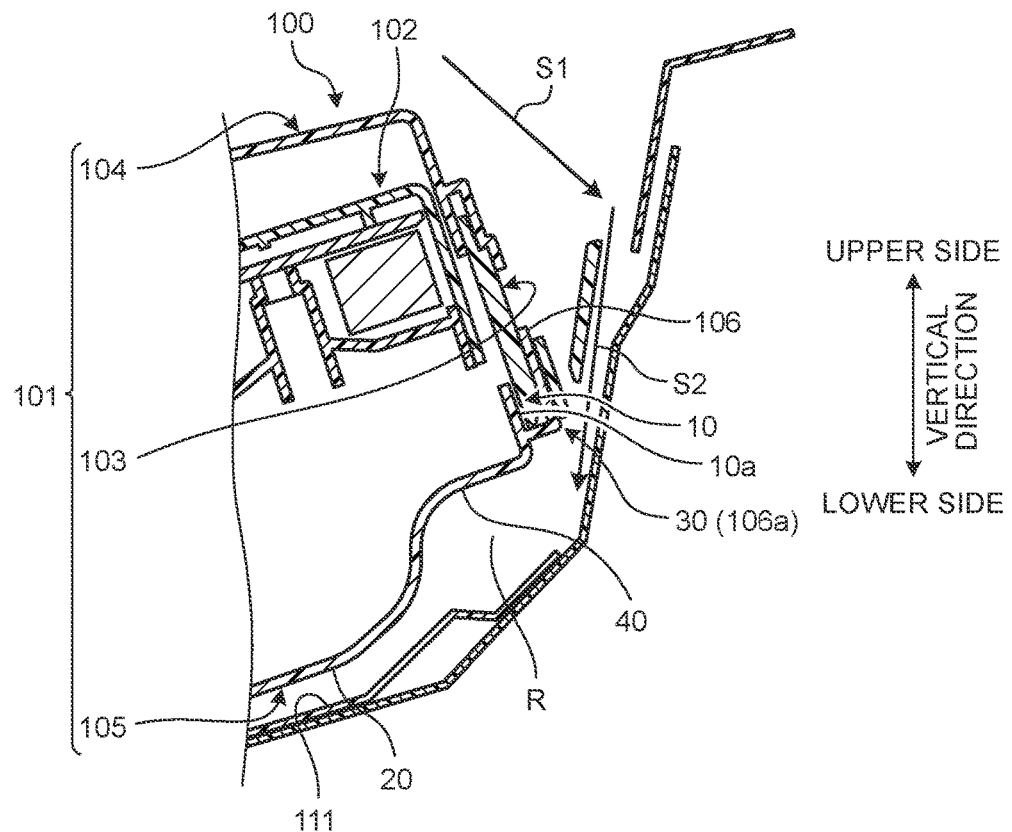
FIG. 5 is a sectional view taken along line V-V in FIG. 4.
Figure 6:
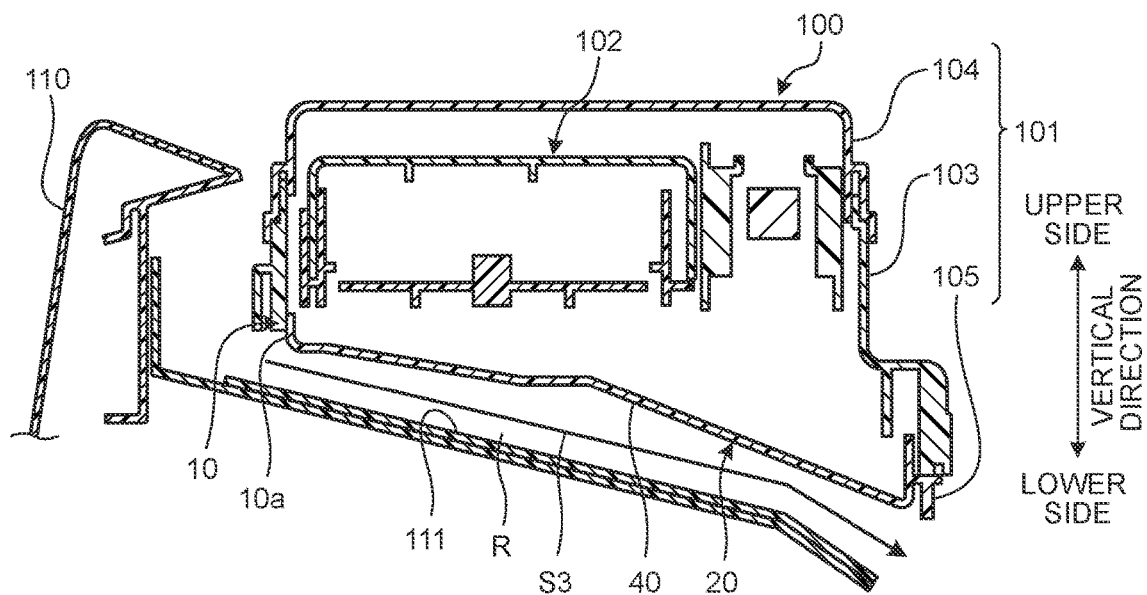

FIG. 1 is a perspective view illustrating a schematic configuration of an electrical connection box according to an embodiment of the present invention. FIG. 2 is a rear view of the electrical connection box according to the embodiment viewed in the arrow II direction illustrated in FIG. 1. FIG. 3 is a perspective view of the electrical connection box according to the embodiment viewed from below. FIG. 4 is a plan view illustrating main parts of the electrical connection box according to the embodiment when mounted in a vehicle with an upper cover removed. FIG. 5 is a sectional view taken along line V-V in FIG. 4. FIG. 6 is a sectional view taken along line VI-VI in FIG. 4. FIG. 1 illustrates electronic components in the electrical connection box by dotted lines.

An electrical connection box 100 according to the embodiment and illustrated in FIG. 1 is mounted in a vehicle such as an automobile, and distributes, through various electronic components 102 or other components, electric power supplied from a power source such as a battery to various electronic devices provided in the vehicle. The electrical connection box 100, as illustrated in FIG. 1, is coupled to a wire harness 150, and collectively houses inside electrical equipment, such as connectors, fuses, relays, branches, and electronic control units, that compose parts for connection processing such as electrical wires 151 or other parts. The electrical connection box 100 is disposed, for example, in an engine room of the vehicle and connected between the power source such as a battery and the various electronic devices provided in the vehicle. In the embodiment, the electrical connection box 100 is disposed inside with respect to an outer panel 110 (illustrated in FIG. 6) exposed to the exterior of the vehicle, and adjacent to the outer panel 110. In addition, in the embodiment, the electrical connection box 100 is disposed at the vertically upper side of a panel 111 (illustrated in FIG. 6) of a vehicle body, the panel being a part of the engine room. The electrical connection box 100 may also be referred to as a junction box, a fuse box, or relay box. In the embodiment, however, the alternatives are collectively referred to as an electrical connection box.

The electrical connection box 100 illustrated in FIG. 1 houses the various electronic components 102 in a housing space inside a box main body 101. The box main body 101 includes, as illustrated in FIG. 1, FIG. 2, and FIG. 3, a body 103 (corresponding to a first housing), an upper cover 104, and a lower cover 105 (corresponding to a second housing), for example. The box main body 101 has a three-layer structure, which is divided to the body 103, the upper cover 104, and the lower cover 105. The body 103, the upper cover 104, and the lower cover 105 are formed of insulating synthetic resin. The body 103 is the main member forming the housing space in which the electronic components 102 are mounted. The body 103 is formed in a substantially tubular square shape, and has openings on the vertically upper and lower sides with the electrical connection box 100 connected to the engine room, for example. The upper cover 104 is a lid-like member that covers the opening on the vertically upper side of the body 103. The lower cover 105 is a dish-like (tray-like) member that is installed to the body 103 and covers the opening on the vertically lower side of the body 103. In the box main body 101, the upper cover 104 is installed on the vertically upper side of the body 103 and the lower cover 105 is installed on the vertically lower side of the body 103 in such a manner that the opening on the vertically upper side of the body 103 faces the opening of the upper cover 104, and the opening on the vertically lower side of the body 103 faces the opening of the lower cover 105. In the box main body 101, the upper cover 104 and the lower cover 105 are locked to the body 103 with various types of locking mechanisms 106. The direction of stacking the body 103, the upper cover 104, and the lower cover 105 is typically the vertical direction with the electrical connection box 100 being disposed in the engine room. However, depending on the installation condition of the electrical connection box 100, the members may be stacked at a certain angle to the vertical direction.

The various electronic components 102 mounted in the housing space inside the box main body 101 include, as described above, connectors, fuses, relays, branches, and electronic control units, for example. In the electrical connection box 100, as illustrated in FIG. 4, the various electronic components 102 are mounted in a large number of cavities formed by, for example, a partition wall 107 of any shape that is integrally formed with the body 103, and a block 108 of any shape that is removably attached to the body 103. In this case, the partition wall 107 and the block 108, for example, are made of insulating synthetic resin, as is the case of the body 103 and other parts. In the electrical connection box 100, terminals or the like of the electrical wires 151 are fitted from the vertically lower side and electrically connected to the cavities in which the various electronic components 102 are mounted. The electrical wires 151 are routed through an opening 109 or the like and connected to the electronic components 102. The electrical connection box 100 configured as described above is installed in the vehicle with fixing brackets 112 being fixed to the panel 111, for example. The fixing brackets 112 are provided to the body 103 and the lower cover 105 of the box main body 101. The electrical connection box 100 and, for example, the electrical wires 151 electrically connected to the electronic components 102 constitute the wire harness 150 routed in a vehicle such as an automobile. In other words, the wire harness 150 includes the electrical connection box 100 and the electrical wires 151 electrically connected to the electronic components 102 in the electrical connection box 100.

Hereinafter, the vertical direction, the vertically lower end portion, the vertically upper end portion, the vertically upper side, and the vertically lower side described in the present specification respectively mean the vertical direction, the vertically lower end portion, the vertically upper end portion, the vertically upper side, and the vertically lower side with the electrical connection box 100 being fixed to the panel 111 and installed in the vehicle.

The lower cover 105 included in the box main body 101 is a dish-like (tray-like) member that covers the opening on the vertically lower side of the body 103 as illustrated in FIG. 2 and FIG. 3. The lower cover 105 includes a rectangular frame 10 (corresponding to a frame) formed in a substantially square shape, and a bottom 20 that covers the opening on the vertically lower side of the rectangular frame 10. The rectangular frame 10 includes, at the vertically upper end portion of an outer side-face 10a, the locking mechanisms 106 used for locking the lower cover 105 to the body 103. The bottom 20 faces the panel 111 at the vertically lower side of the bottom 20. The bottom 20 is formed in a flat plate shape and disposed parallel to the facing panel 111.

The lower cover 105 thus configured is disposed in such a manner that the outer side-face 10a of the rectangular frame 10 and the bottom 20 are parallel to the panel 111, with the electrical connection box 100 being fixed to the panel 111. The lower cover 105 is disposed with the outer side-face 10a of the rectangular frame 10 and the bottom 20 being close to the panel 111. The distance from the panel 111 to the outer side-face 10a of the rectangular frame 10 and the bottom 20 of the lower cover 105 is approximately 5 mm, for example.

As illustrated in FIG. 5, the lower cover 105 includes, on its outer surface, an inlet 30 having the smallest distance from the panel 111 and allows liquid that has entered the engine room to pass through between the inlet 30 and the panel 111. In the embodiment, the inlet 30 is a vertically lower end portion 106a that is a part of one of the locking mechanisms 106 formed on the vertically upper end portion of the outer side-face 10a. Note that the distance from the panel 111 described in the present specification means the smallest distance among distances from the panel 111 to positions on the outer surface of the lower cover 105.

In the embodiment, the lower cover 105 includes, as illustrated in FIG. 5, a channel-forming depression 40 provided on the vertically lower side than the inlet 30. The channel-forming depression 40 allows liquid that has entered between the bottom 20 of the lower cover 105 and the panel 111 through the inlet 30 to flow between the bottom 20 and the panel 111 to the outside. The channel-forming depression 40 forms, between it and a surface of the panel 111 vertically facing it, a channel R (a space surrounded by the alternate long and two short dashed lines illustrated in FIG. 2, FIG. 3, and FIG. 4) that allows liquid to flow to the outside. Note that the outside described in the present specification means an area external to the space between the bottom 20 and the panel 111.

Specifically, the channel-forming depression 40 is formed by, as seen in a sectional view, a part of the rectangular frame 10 and a part of the bottom 20, the parts being bent toward the inside of the lower cover 105 so that the distance from the panel 111 to the channel-forming depression 40 is larger than that from the panel 111 to the inlet 30, that is, the vertically lower end portion 106a of the locking mechanism 106. In the embodiment, the channel-forming depression 40 is formed on a boundary between the rectangular frame 10 and the bottom 20. The distance from the panel 111 to a portion of the bottom 20 on the vertically lower side than the channel-forming depression 40 is smaller than the distance from the panel 111 to the channel-forming depression 40.

The channel-forming depression 40 is formed in a straight line along the surface of the panel 111 that gradually inclines toward the vertically lower side in one direction to the right in FIG. 6. In the embodiment, the channel-forming depression 40 is formed in a straight line along the one direction, that is, the direction toward the center of the vehicle in the vehicle width direction, with the electrical connection box 100 being fixed to the panel 111. The channel-forming depression 40 is formed over the entire length of the lower cover 105 in the vehicle width direction. That is, the channel-forming depression 40 is formed over the entire length of the lower cover 105, along the surface of the panel 111 that gradually inclines toward the vertically lower side in the one direction.

In addition, a width of the channel-forming depression 40 in the horizontal direction gradually increases as the channel-forming depression 40 extends along the surface of the panel 111 and toward the vertically lower side. Specifically, in the embodiment, the surface of the panel 111 facing the channel-forming depression 40 in the vertical direction gradually inclines toward the vertically lower side as the surface extends toward the center in the vehicle width direction. The width of the channel-forming depression 40 in the horizontal direction gradually increases toward the center in the vehicle width direction. Thus, the channel R formed between the channel-forming depression 40 and the surface of the panel 111 gradually increases in its width in the horizontal direction as the channel R extends toward the center in the vehicle width direction, as illustrated in FIG. 3 and FIG. 4.

Assembling of the electrical connection box 100 configured as described above is performed by, for example, installing the lower cover 105 to the body 103, mounting the various electronic components 102 in the housing space, and installing the upper cover 104 to the body 103. The assembled electrical connection box 100 is installed in the vehicle by being fixed to the panel 111 in the engine room with the fixing brackets 112.

With the electrical connection box 100 installed in the engine room, when the vehicle is subjected to high-pressure washing, for example, liquid may enter the engine room along the arrow S1 in FIG. 5. The liquid that has entered the engine room may then enter between the electrical connection box 100 and the panel 111. The liquid enters the inlet 30 of the electrical connection box 100. Through the inlet 30 along the arrow S2 in FIG. 5, the liquid enters between the lower cover 105 and the panel 111. The electrical connection box 100 leads the liquid that has entered between the lower cover 105 and the panel 111 to the channel-forming depression 40, through which the liquid flows along the surface of the panel 111 to the vertically lower side as indicated by the arrow S3 in FIG. 6. The channel-forming depression 40 of the electrical connection box 100 allows the liquid that has entered between the lower cover 105 and the panel 111 to flow to the outside. The liquid discharged from between the lower cover 105 and the panel 111 to the outside is discharged out of the vehicle body through a gap or the like in the vehicle body.

As described above, the electrical connection box 100 includes the channel-forming depression 40 on the bottom 20 on the vertically lower side than the inlet 30. The channel-forming depression 40 is bent toward the inside of the lower cover 105. On the electrical connection box 100, the channel-forming depression 40 is formed over the entire length of the bottom 20, along the surface of the panel 111 that gradually inclines toward the vertically lower side in the one direction. Through the channel-forming depression 40, the electrical connection box 100 allows the liquid that has entered between the bottom 20 and the panel 111 to flow along the surface of the panel and to the outside. In this manner, even when the outer surface of the box main body 101 is formed along the surface of the panel 111, and the gap between the outer surface of the box main body 101 and the surface of the panel 111 is small, the electrical connection box 100 can lead liquid that has entered through the inlet 30 to the channel-forming depression 40, through which the liquid can be discharged to the outside. Because the electrical connection box 100 leads the liquid that has entered through the inlet 30 to the channel-forming depression 40, the liquid is prevented from accumulating around the inlet 30, and thus from accumulating around a seam between the lower cover 105 and the body 103. Consequently, the electrical connection box 100 exerts effects in which, even when the outer surface of the box main body 101 is formed along the surface of the panel 111, and the gap between the outer surface of the box main body 101 and the surface of the panel 111 is small, liquid that has entered the gap can be prevented from accumulating around the seam between the body 103 and the lower cover 105, and thus from entering inside the box main body 101 including the body 103, the lower cover 105, and other members.

On the electrical connection box 100, the width of the channel-forming depression 40 gradually increases as the channel-forming depression 40 extends along the surface of the panel 111 and toward the vertically lower side. Thus, on the electrical connection box 100, the width of the channel-forming depression 40 gradually increases as the channel-forming depression 40 extends downstream of liquid flow. Consequently, the electrical connection box 100 exerts effects in which liquid can be prevented from flowing backward in the channel-forming depression 40, from accumulating around a seam between the body 103 and the lower cover 105, and thus from entering the box main body 101 including the body 103, the lower cover 105, and other members.

The electrical connection box 100 includes the inlet 30 that is the vertically lower end portion 106a being a part of the locking mechanism 106. Thus, the electrical connection box 100 exerts effects in which liquid can be prevented from accumulating around the vertically lower end portion 106a of the locking mechanism 106, that is, around the seam between the body 103 and the lower cover 105, and thus from entering inside the box main body 101 including the body 103, the lower cover 105, and other members.

The wire harness 150 described above includes the electrical connection box 100, and thus exerts an effect in which liquid is prevented from entering inside the box main body 101 of the electrical connection box 100, the box main body 101 including the body 103, the lower cover 105, and other members.

The electrical connection box 100 according to the present invention is not limited to the embodiment described above, and can have various modifications within the scope described in the claims. For example, the electrical connection box 100 according to the present invention may include the box main body 101 divided in two layers. In the present invention, the channel-forming depression 40 may extend along any direction instead of the vehicle width direction. In the present invention, the channel-forming depression 40 does not need to be formed over the entire length of the lower cover 105 in one direction. That is, in the present invention, it is sufficient that the channel-forming depression 40 is formed along the surface of the panel 111 facing the channel-forming depression 40 in the vertical direction, the surface gradually inclining toward the vertically lower side as the surface extends in one direction, so that liquid can be discharged to the outside. In the present invention, the width of the channel-forming depression 40 may gradually increase as the channel-forming depression 40 extends along the surface of the panel 111 that gradually inclines toward the vertically lower side as the surface extends in any direction, not limited to the vehicle width direction. Alternatively, a width of the channel-forming depression 40 in the vertical direction may gradually increase. That is, in the present invention, it is sufficient that the cross-section of the channel-forming depression 40 gradually increases as the channel-forming depression 40 extends, toward the vertically lower side, along the surface of the panel 111 facing the channel-forming depression 40 in the vertical direction. In the present embodiment, not only the vertically lower end portion 106a but also any part of the locking mechanism 106 may be the inlet 30. Furthermore, in the present embodiment, the inlet 30 may be provided to the bottom 20, and the channel-forming depression 40 may be formed by only the bottom 20 bent toward the inside of the lower cover 105.

The electrical connection box according to the present embodiment includes the channel-forming depression on at least the bottom of the second housing of the box main body. The channel-forming depression is formed on the vertically lower side than the inlet by being bent toward the inside of the second housing. On the electrical connection box, the channel-forming depression is formed along the surface of the panel to allow liquid that has entered between the bottom and the panel to flow to the outside. In this manner, even when the outer surface of the box main body is formed along the surface of the panel, and the gap between the outer surface of the box main body and the surface of the panel is small, the electrical connection box can lead liquid that has entered the gap through the inlet to the channel-forming depression, through which the liquid can be discharged to the outside. Consequently, the electrical connection box exerts effects in which, even when the outer surface of the box main body is formed along the surface of the panel, and the gap between the outer surface of the box main body and the surface of the panel is small, liquid that has entered the gap can be prevented from accumulating around the seam between the first housing and the second housing, and thus from entering inside the box main body including a plurality of housings.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
   a box main body that is fixed to a vehicle body and includes a first housing in which an electronic component is mounted and a second housing installed on a vertically lower side of the first housing with a locking mechanism, wherein
   the second housing includes
      a frame that includes the locking mechanism on an outer side-face of the frame,
      a bottom that is disposed parallel to a panel of the vehicle body, the panel facing the bottom, and covers a vertically lower end portion of the frame,
      an inlet that is provided on an outer surface of the second housing and has a smallest distance from the panel, and
      a channel-forming depression in an exterior surface of the bottom, and that is provided on the vertically lower side than the inlet, formed by bending at least a part of the bottom toward inside of the second housing, and formed along a surface of the panel gradually inclining toward the vertically lower side as the surface extends in one direction, so as to allow liquid that has entered between the bottom and the panel to flow from between the bottom and the panel to the outside.

2. The electrical connection box according to claim 1, wherein
   a width of the channel-forming depression gradually increases as the channel-forming depression extends along the surface of the panel and toward the vertically lower side.

3. The electrical connection box according to claim 2, wherein
   a part of the locking mechanism is the inlet.

4. The electrical connection box according to claim 1, wherein
   a part of the locking mechanism is the inlet.

5. A wire harness comprising:
   an electrical connection box that includes a box main body that is fixed to a vehicle body and includes a first housing in which an electronic component is mounted and a second housing installed on a vertically lower side of the first housing with a locking mechanism; and
an electrical wire that is electrically connected to the electronic component, wherein
the second housing includes
- a frame that includes the locking mechanism on an outer side-face of the frame,
- a bottom that is disposed parallel to a panel of the vehicle body, the panel facing the bottom, and covers a vertically lower end portion of the frame,
- an inlet that is provided on an outer surface of the second housing and has a smallest distance from the panel, and
- a channel-forming depression in an exterior surface of the bottom, and that is provided on the vertically lower side than the inlet, formed by bending at least a part of the bottom toward inside of the second housing, and formed along a surface of the panel gradually inclining toward the vertically lower side as the surface extends in one direction, so as to allow liquid that has entered between the bottom and the panel to flow from between the bottom and the panel to the outside.

\* \* \* \* \*